6575X
DeG. Fowler,
Button.
No
Patented June 13 1831.
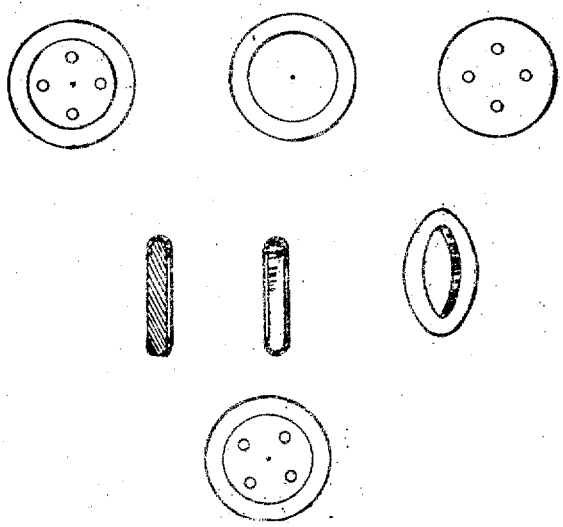

June 13. 1831

6575X De Grasse Fowler North Branford Connecticut

Letters Patent.

The Schedule referred to in these Letters Patent and making part of the same
containing a description in the words of the said De Grasse Fowler him
self of his improvement in the mode of making wood Buttons
commonly called dead eyed Wood Buttons.

To all persons to whom these presents shall come. De Grasse Fowler of
Branford in the County of New Haven and State of Connecticut sendeth.
Greeting). Be it known that I the said De Grasse Fowler have made
invented constructed and applied to use a new and useful improvement
in Wood Buttons commonly called dead eyed Wood Buttons and such as
are now commonly used for suspenders and other purposes which im
provement I specify & describe in the words following viz. This improve-
ment consists in adding to the common Wood Button called the dead
eyed and Button such as is now commonly used for suspenders more partic
ularly & also for some other purposes a rim of some suitable metal
such as tin, brass, copper or other proper metal around the outer circumfer-
ence of said Button and extending toward the middle of said Button
far enough on the back side of the Button to have said rim firmly set
on upon the circumference say one fifth to one quarter part more or less
of the radius of the Button and extending on the front side of the Button
perhaps twice as far so that the same may make an ornamental rim
with a bead raised in the middle of the front part of the rim and
depressed towards the edge of the Button and toward the inner part
of the front side of the rim. and thus leaving about one half of
the front side of the Button uncovered. The holes through which
the thread or cord by which the Button is made fast to the gar-
ment are to be three or four more or less in number and inside of
the said rim of the Button. By this means increased firmness
and durability are given to the common Wood Button as above descri-
bed. while the same is sufficiently ornamental to be used upon
such garments as are usually worn in this Country. What I claim 6575X June 13, 1831 as my improvement and for which only I solicit a patent is the addition of a metallic rim or edge to the common wood Button now used for suspenders and some other purposes, by means of which the said Button is rendered firmer and more durable.

In testimony that the above is a true specification of my said improvement as above described I have hereto set my Hand and seal the 6th day of May 1831.

De Grasse Fowler.

Exd. Witness

[illegible] Saml. J. Hitchcock

Maltby Fowler

494

(Patented June 13. 1831)